United States Patent [19]

Kirkham

[11] 4,199,286
[45] Apr. 22, 1980

[54] POWER DRAWBOLT WITH PLANETARY DRIVE

[75] Inventor: Edward E. Kirkham, Brookfield, Wis.

[73] Assignee: Kearney & Trecker Corporation, West Allis, Wis.

[21] Appl. No.: 971,349

[22] Filed: Dec. 20, 1978

[51] Int. Cl.² ............................................. B23C 5/26
[52] U.S. Cl. ................................. 409/233; 408/239 A
[58] Field of Search .................... 409/233; 408/239 R, 408/239 A

[56] References Cited
U.S. PATENT DOCUMENTS

| | | | |
|---|---|---|---|
| 2,557,582 | 6/1951 | Turrettini | 409/233 |
| 3,220,313 | 11/1965 | Schroeder | 409/233 |
| 3,530,321 | 9/1970 | Reitherman | 310/75 |
| 3,633,457 | 1/1972 | Reeber | 409/233 |

*Primary Examiner*—Gil Weidenfeld
*Attorney, Agent, or Firm*—Cyril M. Hajewski

[57] ABSTRACT

A Drawbolt is rotatably mounted within the spindle of a machine tool to secure a toolholder to a socket in the front end of the spindle. First and second spur gears are formed on the rear end of the spindle and drawbolt, respectively, and are positioned side by side. The two spur gears are equal in diameter, but have differing numbers of teeth. A planetary gear cage surrounds the spur gears and has pinion gears which are meshed with both spur gears. The planetary gear cage is attached to the armature of an electric motor which, when energized, rotates the cage and thus causes rotation of the drawbolt at a reduced speed. The speed reduction depends on the difference in the number of teeth in the two spur gears. The armature is axially shiftable to move a locking ring on the planetary gear cage into and out of engagement with the spur gear on the spindle.

10 Claims, 4 Drawing Figures

POWER DRAWBOLT WITH PLANETARY DRIVE

BACKGROUND OF THE INVENTION

This invention relates to power drawbolts which are rotatably mounted within a machine tool spindle and are rotated by an electric motor to screw into a threaded opening in a toolholder to secure the toolholder within a socket on the front end of the spindle. The drawbolt rotates with the spindle during machining operations, and therefore, in the past, it was believed to be necessary to couple the motor to the drawbolt through a clutch since the motor was mounted on the spindle head.

The principal object of this invention is to provide a motor drawbolt coupling which eliminates the need for a clutch.

An additional object of this invention is to provide a motor drawbolt coupling containing a more compact speed reducing gear arrangement than heretofore known in the art.

Other objects and advantages of the invention will be apparent from the detailed description herein.

SUMMARY OF THE INVENTION

First and second spur gears are formed on the rear end of a spindle and drawbolt, respectively. The gears are positioned side by side and are equal in diameter, but have a differing number of teeth. A planetary gear cage surrounds the spur gears and has pinion gears which mesh with both of the spur gears. The planetary gear cage is attached to the armature of an electric motor which, when energized, rotates the gear cage and thus causes the drawbolt to rotate at a reduced speed. The speed reduction depends on the difference in the number of teeth in the two spur gears. In the preferred embodiment, the motor armature is axially shiftable to move a locking ring on the planetary gear cage into and out of engagement with the spur gear on the spindle.

DESCRIPTION OF THE PREFERRED EMBODIMENTS

Figure 1:
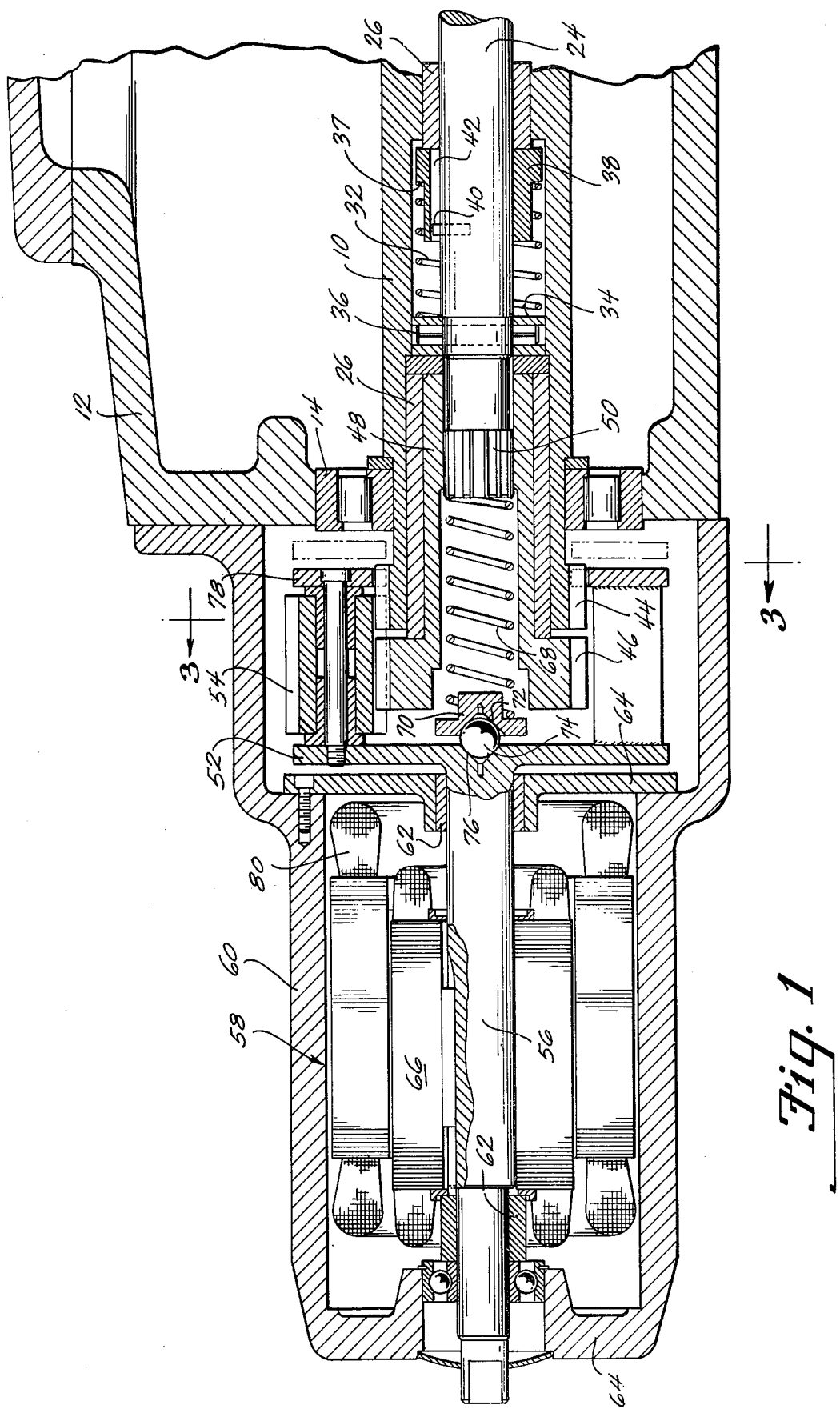
FIG. 1 is an axial sectional view of the rear end of a spindle and drawbolt incorporating the motor drawbolt coupling of this invention.
Figure 2:
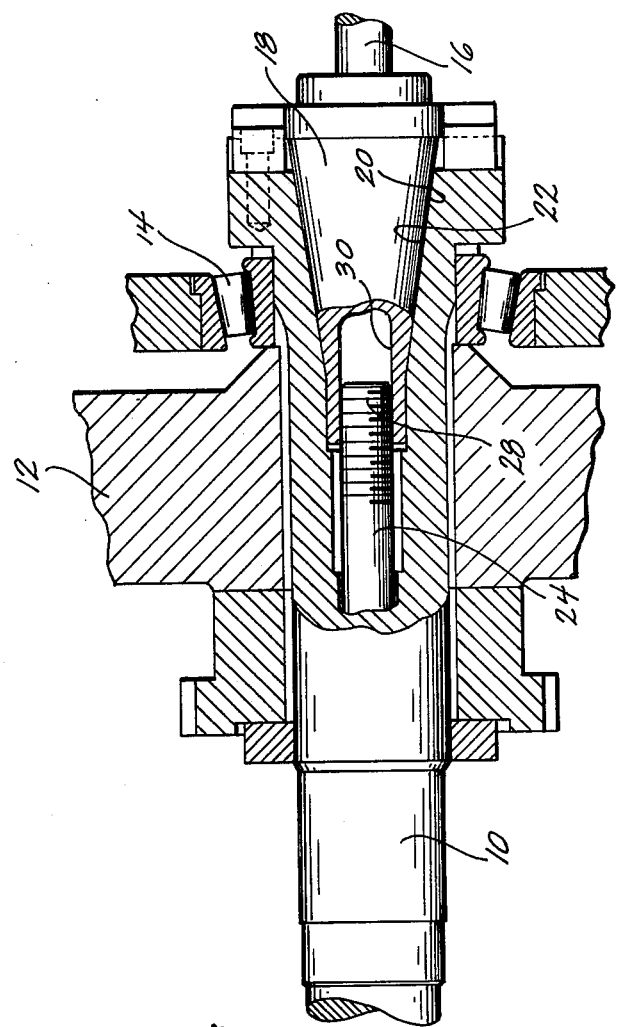
FIG. 2 is an axial sectional view of the front end of the spindle and drawbolt shown in FIG. 1.

Referring to FIGS. 1 and 2, a hollow, cylindrical spindle 10 is journaled for rotation within a spindle head 12 by bearings 14. Spindle head 12 is mounted on a machine tool upright (not shown) by conventional means (not shown) and is movable along the axis of spindle 10. The machine tool upright is movable along the conventional X and Y axes. The front end of spindle 10 is adapted to receive a cutting tool 16 (FIG. 2) which is mounted in a toolholder 18. Toolholder 18 has a conical rear surface 20 which mates with a conical socket 22 in the front end of spindle 10.

A drawbolt 24 is rotatably mounted within the hollow interior of spindle 10 by bearing sleeves 26 (FIG. 1). The front end of drawbolt 24 carries threads 28 (FIG. 2) which match a threaded opening 30 in toolholder 18. To insert a toolholder 18 into socket 22, drawbolt threads 28 are engaged in threaded opening 30 and drawbolt 24 is rotated while spindle 10 remains stationary to screw threads 28 into opening 30, which draws the conical rear surface 20 of toolholder 18 into contact with toolholder socket 22. A spring 32 (FIG. 1) urges drawbolt 24 rearwardly by bearing against washer 34 that rests on a pin 36. Pin 36 extends through a bore in drawbolt 24. The front end of spring 32 is supported by a shoulder 37 on a sleeve 38 that rests on the rear edge of one of the bearing sleeves 26. A pin 40 projects from the outer surface of drawbolt 24 and rides in a slot 42 in sleeve 38. Pin 40 limits the forward movement of drawbolt 24 by abutting against the rear edge of the adjacent bearing sleeve 26.

A first spur gear 44 is formed on the rear end of spindle 10 and a second spur gear 46 is formed on a sleeve 48 which is rotatably mounted in rear bearing sleeve 26 and is slidably coupled to drawbolt 24 by splines 50. Spur gears 44 and 46 are positioned side by side and are equal in diameter, but have a differing number of teeth to provide for a speed reduction. A planetary gear cage 52 having pinion gears 54 journaled therein surrounds the spur gears 44 and 46. Pinion gears 54 mesh with both of the spur gears 44 and 46. When planetary gear cage 52 is rotated, it causes rotation of spur gear 46 at a greatly reduced speed which depends on the difference in the number of teeth between gears 44 and 46. The direction of rotation depends upon which gear has the most teeth and on the direction of rotation of planetary gear cage 52. Gear 44 remains stationary during rotation of planetary gear cage 52 because of the greater mass connected to it. Planetary gear cage 52 is coaxial with drawbolt 24.

Planetary gear cage 52 is rigidly attached to the shaft 56 of a three phase induction motor 58 and rotates therewith. Motor 58 is mounted in a housing 60 which is rigidly attached to spindle head 12. Armature shaft 56 is coaxial with drawbolt 24 and is axially slidably mounted within housing 60 by means of sleeves 62 in end plates 64. The motor armature 66 is normally pushed axially off center by a spring 68 which extends between the rear of drawbolt 24 and a collar 70 having a conical central depression 72 in which a ball 74 is seated. Ball 74 also bears against a conical depression 76 in armature shaft 56 and serves to couple the force of spring 68 to shaft 56 without preventing rotation of shaft 56.

Figure 3:
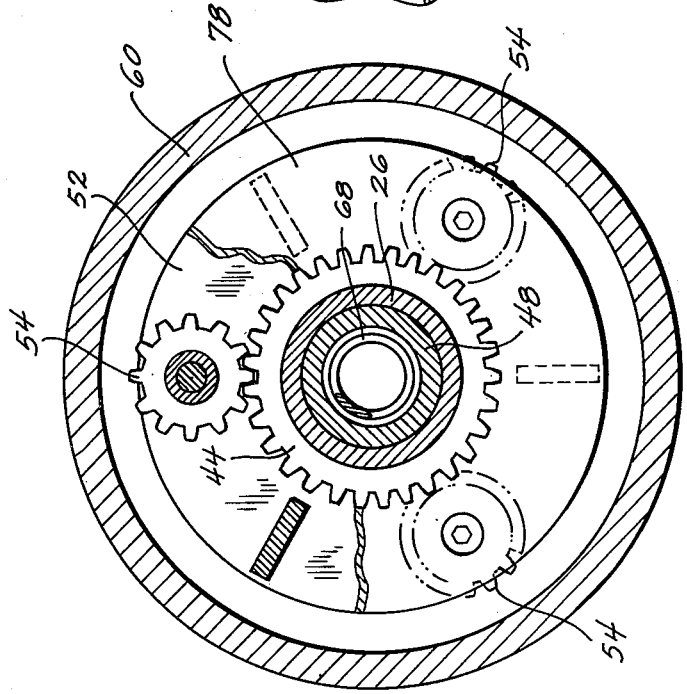
FIG. 3 is a cross-sectional view taken on the line 3—3 of FIG. 1.

A notched locking ring 78 (FIGS. 1 and 3) is attached to the front end of planetary gear cage 52 and engages spur gear 44 when armature 66 is in its rearward off center position as shown in solid lines in FIG. 1. When armature 66 is moved axially to its central position, to the right in FIG. 1, locking ring 78 moves to the position shown in broken lines in FIG. 1 and disengages from spur gear 44. Since armature 66 is normally spring biased to its rearward off center position, locking ring 78 is normally locked to spur gear 44 which means that the planetary gear cage 52 and motor armature 66 rotate with spindle 10 during machining operations. This is an important feature of the invention since it eliminates the need for a clutch between armature shaft 56 and drawbolt spur gear 46.

When it is desired to rotate drawbolt 24, a single phase excitation is first applied to stator windings 80 to magnetically draw armature 66 to its central position and thus to disengage locking ring 78 from spur gear 44.

The reason that the magnetism from the stator windings 80 draws armature 66 to its central position is that armature 66 is off center with respect to stator 80 in its rearward position, which is shown in solid lines in FIG. 1. With only a single phase of stator winding 80 energized, armature 66 will move axially to its central position but will not rotate. After enough time has elapsed to permit disengagement of locking ring 78, three phase excitation is applied to stator windings 80 to cause rotation of planetary gear cage 52 and thus to rotate drawbolt 24 at a reduced speed. After drawbolt 24 is screwed into or unscrewed from toolholder 18, motor 58 is deenergized and armature shaft 56 is pushed back to its rearward position by spring 68 thereby engaging locking ring 78 with spur gear 44.

Figure 4:
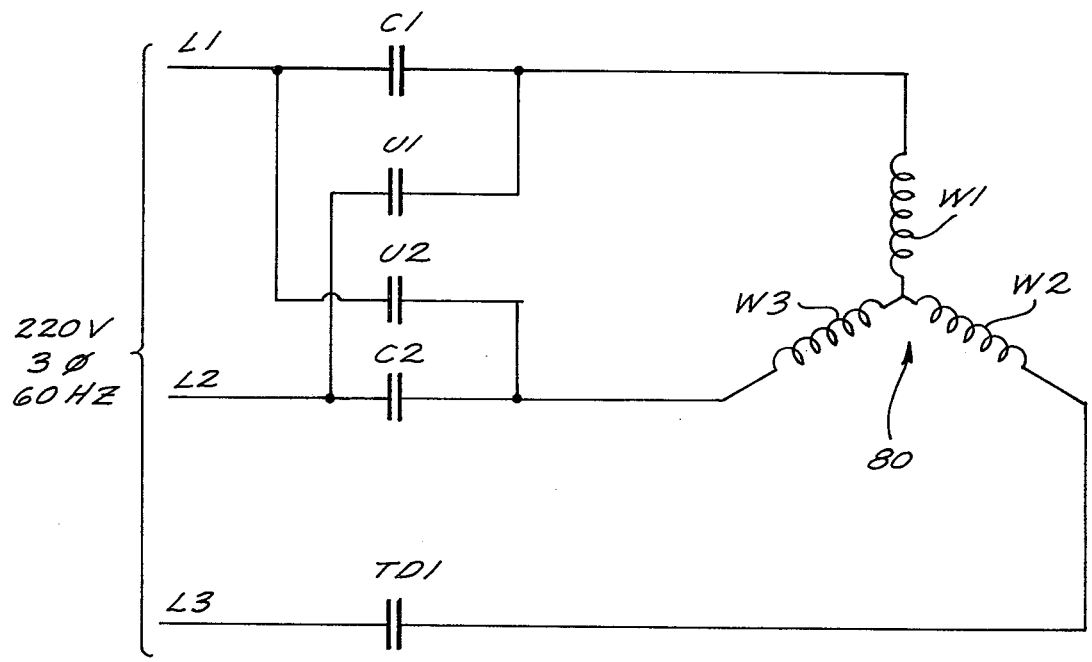
FIG. 4 is a schematic circuit diagram of a motor control circuit for the embodiment of FIGS. 1 to 3.
Figure 4:
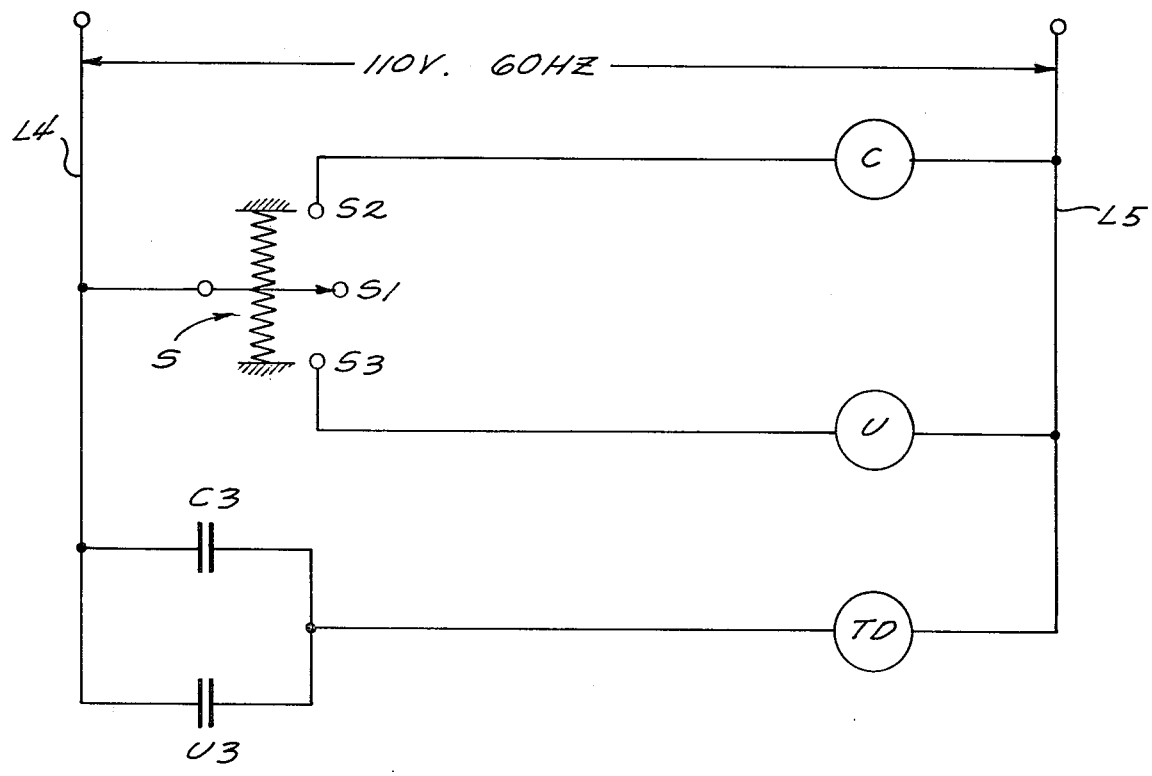

FIG. 4 is a schematic circuit diagram of a motor control circuit for implementing the above-described motor action. The motor is energized by a manually actuated single pole triple throw switch S which is spring-biased to normally rest in its central position S1. To cause motor 58 to rotate in the direction which clamps a toolholder in socket 22, switch S is manually moved to its S2 position and is held there until the clamping action is completed. In the S2 position, switch S energizes the clamping relay C which closes normally open contacts C1, C2 and C3. Contacts C1 and C2 connect a single phase of the three phase source across stator windings W1 and W3 of three phase motor 58. This single phase excitation creates a magnetic field which draws the off center armature 66 forwardly to a central position with respect to stator windings W1, W2 and W3. However, the single phase excitation does not cause armature 66 to rotate. For armature rotation, three phase excitation is required.

When contacts C3 close, they energize a time delay relay TD which delays three phase excitation of stator windings 80 for a short time (e.g. 1 second) to permit locking ring 78 (FIG. 1) to disengage from spur gear 44 due to the forward motion of armature 66 caused by the single phase excitation of windings W1 and W3. After the time delay, normally open contacts TD1 close and apply three phase excitation to stator windings W1, W2 and W3 thereby rotating armature 66, planetary gear cage 52 and drawbolt 24.

When the threaded end of the drawbolt 24 (FIG. 2) is fully screwed into toolholder 18, motor 58 will stall due to the fact that the conical rear surface 20 of toolholder 18 abuts against the conical socket 22 in the front end of spindle 10 and prevents further rotation of drawbolt 24. After the motor stalls, switch S is released and automatically returns to its central position S1. This deenergizes clamping relay C and time delay relay TD and thus deenergizes stator windings W1, W2 and W3.

For rotation of motor 58 in the opposite direction to unscrew the threaded end of drawbolt 24 from the toolholder 18, switch S is manually moved to its S3 position. This energizes unclamp relay U which closes normally open contacts U1, U2 and U3. Contacts U1 and U2 apply single phase excitation to stator windings W1 and W3. Contact U3 energizes time delay relay TD. When time delay relay contacts TD1 close, three phase excitation is applied to windings W1, W2 and W3 with power input lines L1 and L2 reversed from the connection used for clamping. This causes armature 66 (FIG. 1) to rotate in the opposite direction from that used for clamping and thus unscrews the threaded end of drawbolt 24 from toolholder 18. After toolholder 18 is unscrewed from the threaded end of drawbolt 24, switch S is released and automatically returns to its central position S1 thereby deenergizing relays U and TD and windings W1, W2 and W3.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. In a machine tool having a hollow cylindrical spindle;
   a socket on the front end of the spindle for receiving a toolholder;
   a drawbolt rotatably mounted within said spindle and having a threaded front end adjacent to said socket for engaging a threaded hole in said toolholder to secure the toolholder within the socket;
   the improvement comprising a first spur gear attached to the rear end of said spindle;
   a second spur gear attached to the rear end of said drawbolt, said first and second spur gears having the same diameter but having a differing number of teeth and said first and second spur gears being positioned in side by side relationship;
   a planetary gear cage carrying at least one pinion gear which is meshed with both said first and second spur gears;
   a motor having a housing and having an armature rotatably mounted within said housing on an armature shaft; and
   said planetary gear cage being coupled to said armature shaft to be rotated thereby and thus to cause rotation of said drawbolt at a reduced speed.

2. The machine tool according to claim 1 wherein said planetary gear cage is axially slidable and also comprising a locking ring on said planetary gear cage, said locking ring being shaped to engage said first spur gear and being positioned to engage said spur gear in one axial position of said gear cage and to be disengaged from said spur gear in another axial position of said gear cage.

3. The machine tool according to claim 1 wherein said motor armature is axially slidably mounted within said motor housing and wherein said planetary gear cage is rigidly attached to said armature shaft and is axially movable therewith.

4. The machine tool according to claim 3 and also including spring means urging said armature shaft and said planetary gear cage rearwardly away from said rear end of said drawbolt.

5. The machine tool according to claim 4 wherein said motor has a plurality of stator windings and wherein said spring means urges said armature toward an off center position with respect to said motor stator windings,
   whereby energization of one or more of said stator windings creates a magnetic field which moves said armature axially toward a central position against the force of said spring means.

6. The machine tool according to claim 5 and also comprising a locking ring on said planetary gear cage, said locking ring being shaped and positioned to be engaged with said first spur gear when said armature is in its off center position and to be disengaged from said first spur gear when said armature is moved axially to a central position due to energization of one or more of said stator windings, whereby said planetary gear cage and armature are locked to said spindle when said stator windings are deenergized and rotate with said spindle during a machining operation but are unlocked from said spindle when one or more of said stator windings are energized.

7. The machine tool according to claim 6 wherein said motor is a three phase induction motor and also including motor control means for initially applying a single phase excitation to said stator windings to cause said armature and planetary gear cage to move axially to unlock said locking ring from said first spur gear and for subsequently applying three phase excitation to said stator windings to cause said armature and planetary gear cage to rotate.

8. The machine tool according to claim 7 wherein said motor control means includes first excitation means for applying single phase excitation to said stator windings;

time delay means responsive to said first excitation means; and second excitation means responsive to said time delay means, said second excitation means being operable to apply three phase excitation to said stator windings.

9. The machine tool according claim 4 and also comprising a collar on the end of said spring means adjacent to said armature shaft;

a first conical depression in the end of said collar on the side thereof facing said armature shaft;

a second conical depression in the end of said armature shaft facing said collar; and a ball seated within both said first and second conical depressions.

10. A machine tool according to claim 1 wherein said second spur gear is formed on a hollow cylindrical sleeve, said sleeve being slidably attached to said rear end of said drawbolt.

* * * * *